Figure 1:
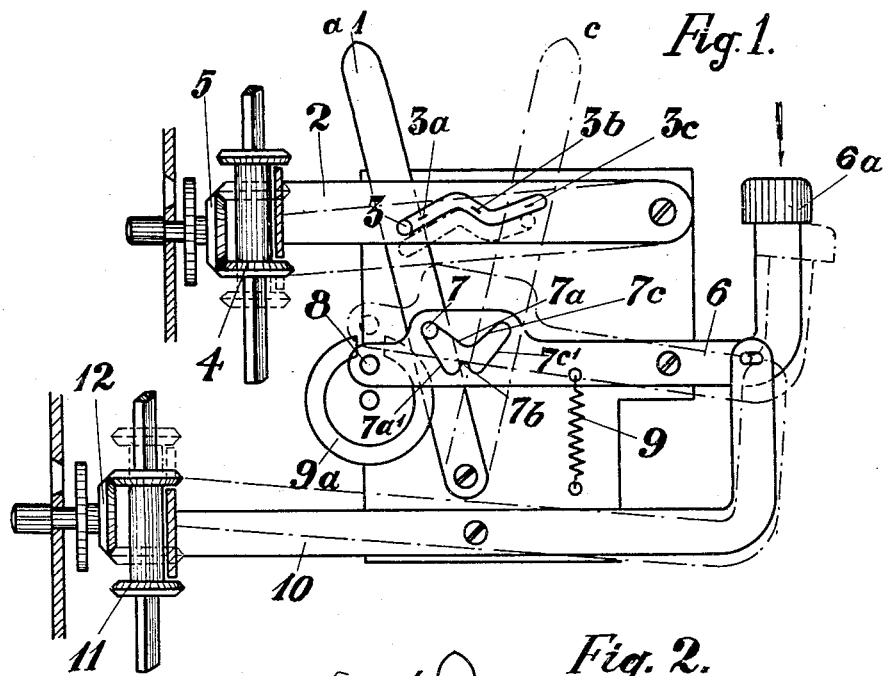

May 1, 1928. 1,668,531

H. SCHMIDT

CALCULATING MACHINE

Filed Oct. 20, 1926 2 Sheets-Sheet 1

Inventor:
Hermann Schmidt
by Locka, Kehlenbeck & Farley
Attorneys.

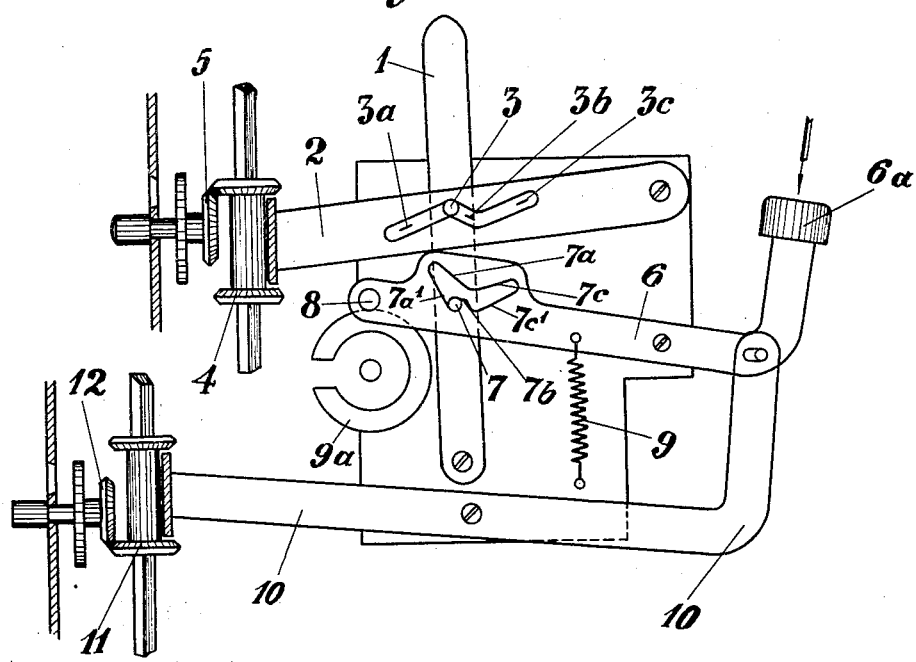

Patented May 1, 1928.

1,668,531

UNITED STATES PATENT OFFICE.

HERMANN SCHMIDT, OF SOMMERDA, GERMANY, ASSIGNOR TO RHEINISCHE METALL-WAAREN-UND MASCHINENFABRIK SÖMMERDA AKTIENGESELLSCHAFT, OF SOMMERDA, GERMANY, A CORPORATION OF GERMANY.

CALCULATING MACHINE.

Application filed October 20, 1926, Serial No. 142,883, and in Germany January 13, 1926.

In certain calculating machines, for instance, such machines as are provided with two counting mechanisms, the product counting mechanism must be shifted when changing from one species of calculation to the other, while the quotient counting mechanism must continue to rotate in the old sense. If, however, a calculation already performed has to be canceled, that is to say an error is to be corrected, the product counting mechanism as well as the quotient counting mechanism must be shifted. These last mentioned shiftings of the counting mechanisms may be performed separately or the shifting devices of both counting mechanisms may be coupled together, so as to form a single shifting device which is provided with two shifting means, for instance levers having a handle or a key, the first of which means causes the setting of the species of calculation and serves to shift the product counting mechanism only, while the second means which causes the cancellation of already performed calculations is used to shift both counting mechanisms.

In the example hereinafter described and shown in the drawings the first shifting means, causing the setting of the device for one or the other species of calculation has the form of a one-armed lever provided with a handle and may in the further description be called "shift lever" or "main shift lever". The second shifting means has the form of a double-armed lever provided with a key and as this means is used for the correction of errors it may hereinafter be called "error key" or "error lever."

The object of the invention is to reduce to a minimum the number of the gear parts which hitherto in shifting devices for the reversing gears in calculating machines were used between the reversing gear proper and the shifting means and which had the form of levers of complicated construction. A still further object of the invention is to provide a safety device and a projection upon the two shifting means which permits or prevents to a certain extent the actuation of each of the shifting means separately or of the two shifting means together this depending upon the operation being performed in the calculating machine. A further object of the invention is to substantially reduce the number of the gear parts serving the purpose of mutual actuation of both shifting means and generally to simplify the whole gear.

To this end the two shifting means, i. e. the main shift lever and the error key, act without any intermediate gear directly upon each other by means of cam mechanism consisting of a projection on the one lever and cam faces on the other lever. A locking device of special construction being provided in the shifting mechanism also serving the purpose of obtaining the above mentioned effect.

Figure 2:
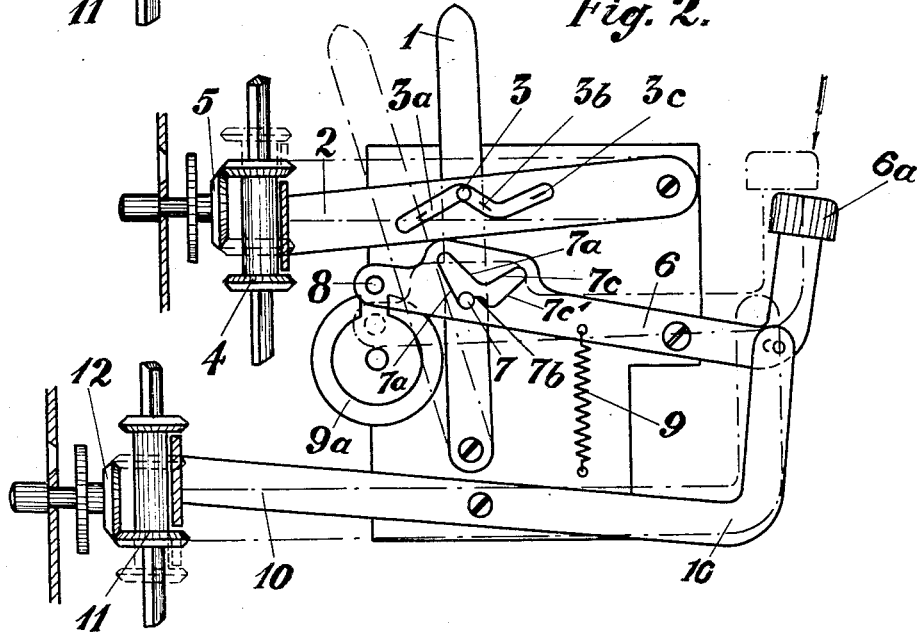

In the accompanying drawings forming part of the specification a device according to the invention is shown by way of example. Fig. 1 illustrates a longitudinal section through the shifting means, Fig. 2 shows a similar longitudinal section with the error key depressed and Fig. 3 is a similar longitudinal section with the error key depressed and locked.

In the three Figures the shift lever is designated 1, the error key 6 and the finger piece of the error key $6^a$. The reversing gear 4, 5 belongs to the product counting mechanism and the second reversing gear 11, 12 forms part of the quotient counting mechanism.

A pin 3 fixed to the shift lever 1 engages a cam slot provided in the lever 2. The cam slot consists of three parts $3^a$, $3^b$ and $3^c$. If the lever 1 is shifted from the position a shown in Fig. 1 in such a manner that its pin 3 engages the transition point between the curved parts $3^a$ and $3^b$ of the cam slot as shown in Fig. 2, the reversing gear 4, 5 is shifted to rotate in opposite direction and therefore the product counting mechanism is set for reversed calculation. By a further displacement of the shift lever the pin 3 is carried to the meeting point of the curved parts $3^b$ and $3^c$ of the cam slot, whereby the original calculation species is reset. If the shift lever 1 is moved still further so as to come in the opposite position $c$ shown in Fig. 1 in dash-and-dotted lines, the product counting mechanism is definitely set to perform calculations of opposite species. The shift lever 1 is influenced by two roof-like inclined surfaces $7^a$ and $7^c$ provided on the error key 6 and pulled against a pin 7 fixed to the lever 1 by means of a spring 9. These inclined surfaces $7^a$ and $7^c$ move the lever 1 into the extreme position $a$ as long as the pin 7 remains in contact with the surface $7^a$, whereas they move the lever 1 into the extreme position $c$ if the surface $7^c$ acts upon the pin 7.

The error key 6 is positively connected to the reversing gear 11, 12 of the quotient counting mechanism and acts upon the pin 7 by means of the surface $7^{a\prime}$ when the shift lever 1 assumes the position $a$ and by means of the surface $7^a$ when the error key is returned to its normal position by the spring 9. By this means the error key 6 and the shift lever 1 are without any intermediate gear, i. e. by means of parts only which are integral with or rigidly connected to them directly coupled together in such a manner that by a pressure exerted upon the error key 6 the shift lever 1 is oscillated from the position $a$ in a direction towards the opposite limit position $c$. The special shape of the surface $7^{a\prime}$ upon actuation of the error key 6, causes the shift lever 1 to move into the position shown in Fig. 2 in which, by depressed error key 6, the product counting mechanism is shifted. The quotient counting mechanism positively connected to the error key 6 is then also shifted. As soon as the error key 6 is released again the spring 9 pulls this key back into its original position and the quotient- and product counting mechanisms again rotate in the old sense as the inclined surface $7^a$ presses the shift lever 1 back into the extreme position $a$.

If at the moment of actuation of the error key 6 the shift lever 1 assumes the position $c$ the product- and quotient counting mechanisms are also shifted to rotate in opposite direction. In this case the shift lever 1 is moved and brought back not by the surfaces $7^{a\prime}$ and $7^a$ but by the surfaces $7^{c\prime}$ and $7^c$.

To prevent throwing over of the shift lever 1 from the surface $7^{a\prime}$ to the surface $7^{c\prime}$ in case of a violent actuation of the error key 6 a locking nose $7^b$ is provided at the point where the two curved surfaces meet at the re-entering angle.

The shiftings caused by the shift lever 1 may be made temporarily permanent by means of the locking device referred to hereinafter, as in most cases several calculations of the same species are carried out one after the other. The shifting of the error key 6, however, is usually to be maintained for one revolution of the crank of the calculating machine only as in general one revolution of the crank is sufficient to correct an error of the calculation. The error key 6 is therefore provided with the spring 9 tending to pull the key 6 back into the original position. For the purpose of making it possible that the error key need not be depressed during the complete revolution of the crank and first of all for the purpose of preventing mistakes by a premature release of the error key, a projection, in the form of a pin 8, is provided on the error key and serves to lock the error key as soon as the main drive of the calculating machine leaves the zero- or normal position. The locking device is formed by a cylinder locking gear one member of which is the projection or pin 8 of the error key while the other member is formed by a short barrel $9^a$ provided with a slot and rotating in synchronism with the main drive. The barrel extends into the path of the pin 8 of the error key 6 during oscillation of said key and prevents oscillations of the key by means of its inner face when the error key 6 assumes the normal position of rest, and return oscillations by its outer face when the error key assumes the oscillated position and therefore the pin 8 is located outside the cylinder barrel. When the single parts of the calculating machine assume the position of rest, the path for the pin 8 is free and therefore the error key is capable of being moved, because in this position of the machine and on account of the synchronous rotation of the cylinder barrel and the main drive of the machine the slot of the cylinder barrel is located above or beneath the pin or projection 8 which then, of course, may pass through the slot.

In known shifting mechanisms for the reversing gears of calculating machines a movement of the shift lever has no influence upon the error key. In the present construction, however, a movement of the shift lever causes a slight lifting and sinking back of the error key 6. If the error key 6 is prevented from making these movements as this is accomplished by the described cylinder locking gear, the shift lever 1 also cannot be moved, that is to say the whole shifting gear is locked.

What I claim is:

1. In a device for shifting the reversing gears for the product- and quotient counting mechanisms of calculating machines, a pivoted lever controlling the position of the gears of the reversing gear for the product counting mechanism, an error key, a main shift lever co-operating with said pivoted lever and error key, a lever pivoted to the machine frame and to the error key for actuating the reversing gear of the quotient counting mechanism and a locking means co-operating with said error key for locking the whole shifting device as long as the main drive of the machine assumes a position other than its position of rest.

2. In a device for shifting the reversing gears of the product- and quotient counting mechanisms of calculating machines, a main shift lever, a projection provided on said main shift lever, an error key provided with surfaces cooperating with said projection for the purpose of directly coupling the main shift lever with the error key forming the shift lever for the quotient counting mechanism, a second projection on the main shift lever, a pivoted lever controlling the position of the gears of the reversing gear for the product counting mechanism, a slot in said pivoted lever for the reception of said second projection on the main shift lever, said slot consisting of an upwardly extending part merging into a downwardly extending part which in turn merges in a second upwardly extending part, and a locking device, consisting of a cylinder barrel having a slot and rotating in synchronism with the drive of the machine and a projection on the error key adapted to engage the said slot in said cylinder barrel.

3. In a device for shifting the reversing gears of the product- and quotient counting mechanisms of calculating machines, a main shift lever, a projection provided on said main shift lever, an error key having rooflike surfaces, said surfaces cooperating with said projection on the main shift lever to directly couple said lever with said key for the purpose of permitting the simultaneous shifting of the reversing gears of both the product and quotient counting mechanism by a movement of the error key a second projection on the main shift lever, a pivoted lever controlling the position of the gears of the reversing gear for the product counting mechanism, a three-part slot in said pivoted lever cooperating with the said second projection of the main shift lever in such a manner that by a movement of the main shift lever from the one extreme position to the other the pivoted lever is oscillated to bring the reversing gear for the product counting mechanism first in a position for performing opposite species of calculation, then to return the said reversing gear into the position for performing the original species of calculation and ultimately to bring the reversing gear again in a position for definitely performing the first mentioned opposite species of calculation.

4. In a device as set forth, a main shift lever, an error key and a cam gear directly coupling the said lever to said key, said cam gear consisting of a projection formed on the said lever and a roof-like slot in said key, said slot including two pairs of superposed guide faces, each consisting of two faces forming an angle, one pair of these guide faces serving to bring the main shift lever from either extreme position into a position for shifting the reversing gear for the product counting mechanism to perform an opposite species of calculation as soon as the error key is depressed, while the other pair of guide faces on return of the error key returns the main shift lever to the extreme position which it occupied before the error key was depressed and caused an oscillation of the said shift lever into a position for shifting the reversing gear of the product counting mechanism in the manner required for performing an opposite species of calculation.

5. In a device as set forth, a main shift lever, an error key serving as a second shift lever, and a cam gear directly connecting said main shift lever to said error key, said cam gear consisting of a projection formed on the said shift lever and two pairs of guide faces cooperating with said projection, the said guide faces forming a closed curve and one pair of faces being provided at the meeting point of their re-entering angle with a projecting nose preventing the throwing over of the main shift lever in case the error key is actuated violently.

6. In a device as set forth, a main shift lever, an error key forming a second shift lever, a cam gear directly coupling said lever and said key together and a locking device, consisting of a cylinder barrel provided with a slot and rotating in synchronism with the drive of the machine and a projection formed on the error key and adapted to engage the said slot in the cylinder barrel for locking the whole shifting gear, said cylinder barrel crossing the path of said projection for the purpose of preventing an oscillation and return movement of the said error key until in the zero position of the machine the position of the slot permits the passage of said projection.

In testimony whereof I have affixed my signature.

HERMANN SCHMIDT.